June 11, 1946.  E. E. STAPLES ET AL  2,401,844
EDUCATIONAL DEVICE
Filed Aug. 19, 1944  2 Sheets-Sheet 1

INVENTORS
Elliott E. Staples and
Bruno Gonella
BY
Conrad A. Dieterich
their ATTORNEY

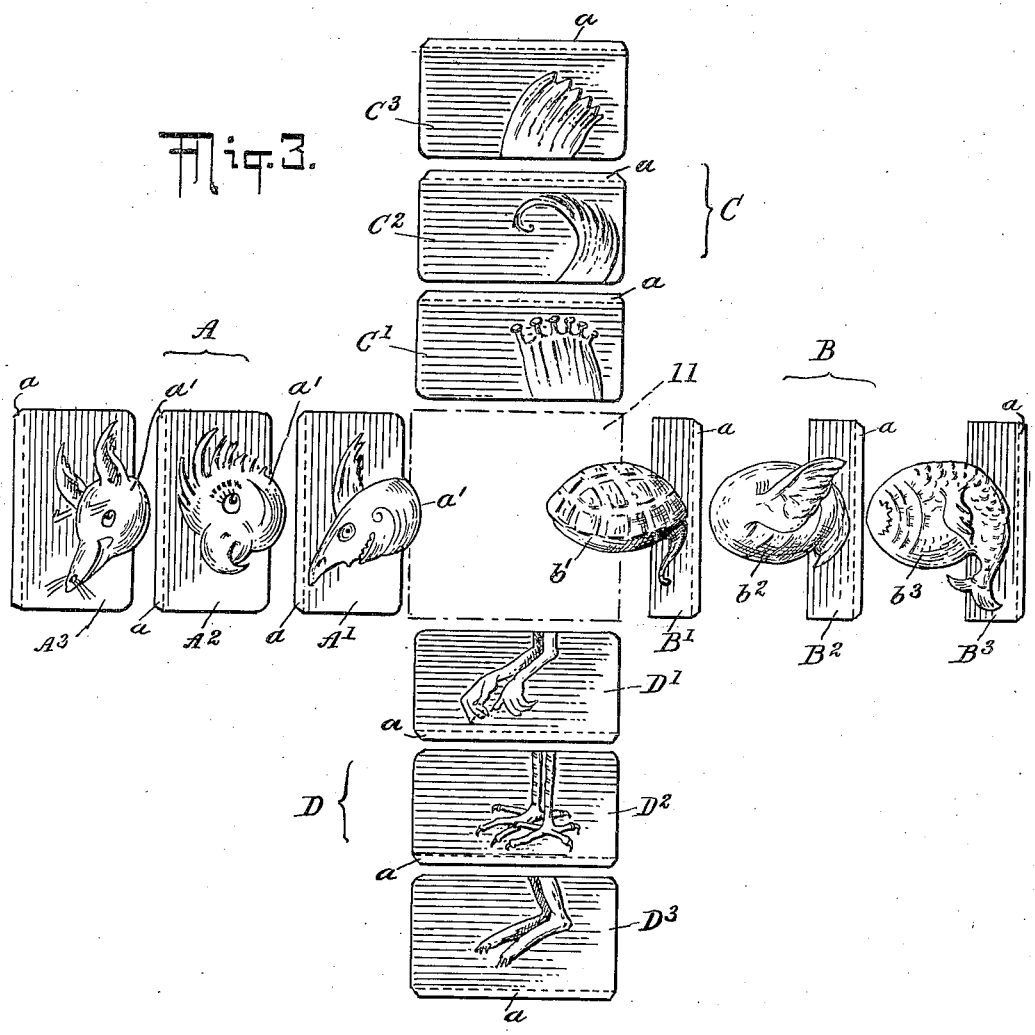

Patented June 11, 1946

2,401,844

UNITED STATES PATENT OFFICE 2,401,844

EDUCATIONAL DEVICE

Elliott E. Staples, Glen Gardner, N. J., and Bruno Gonella, North Bergen, N. J.

Application August 19, 1944, Serial No. 550,192

2 Claims. (Cl. 35—28)

Our invention relates to improvements in educational or amusement devices, and the same has for its object to provide a simple, efficient, and convenient device composed of a plurality of groups of separate elements so arranged that the individual elements of any one group are readily combinable with any of the elements of any of the remaining or other group to form a plurality of different figures or objects.

Further, said invention has for its object to provide a device in which a series of individual foldable elements are arranged angularly with respect to each other upon a support, and foldable inwardly towards each other to form a plurality of different combinations representing figures, objects or devices which may differ in form, shape or character, and be combinable to form a plurality of objects severally distinguishable from each other.

Further, said invention has for its object to provide a device of the character specified which embodies a flat support or mount, and a plurality of series of groups of hinged elements secured thereto in the form of a polygonal figure, and in which the elements of each series are foldable inwardly to combine with any of the elements of the other group to form a plurality of complete figures, devices or representations differing from the others.

Further, said invention has for its object to provide a device of the character specified in which a support or mount, having a plurality of groups of hinged elements, each of distinctive contour and ornamentation, assembled with their outer ends secured to said support, and disposed in the form of a polygonal figure and the free end of each element extending towards a common center and interfoldable and combinable with elements of the other groups to form a plurality of complete figures or devices differing from the others.

Further, said invention has for its object to provide a device of the character specified which embodies a support and a plurality of series of individual hinged elements each possessing a distinctive form or contour and assembled with their outer ends hinged and forming a figure of polygonal outline, and the free ends of the elements of each series extending inwardly towards the center of the polygonal figure and having a contour or outline corresponding substantially with the remaining elements of its respective series and combinable with any of the elements of the other series to form a plurality of composite devices or structures differing from the others.

Other objects will in part be obvious, and in part be pointed out hereinafter.

To the attainment of the aforesaid objects and ends, our invention consists in the novel features of construction and in the combination, connection and arrangement of parts hereinafter more fully described, and then pointed out in the claims.

In the accompanying drawings—

Fig. 3 is a diagrammatic face view showing four groups of elements in separated or extended form and in proper sequence prior to assembly upon a support.

Figure 1:
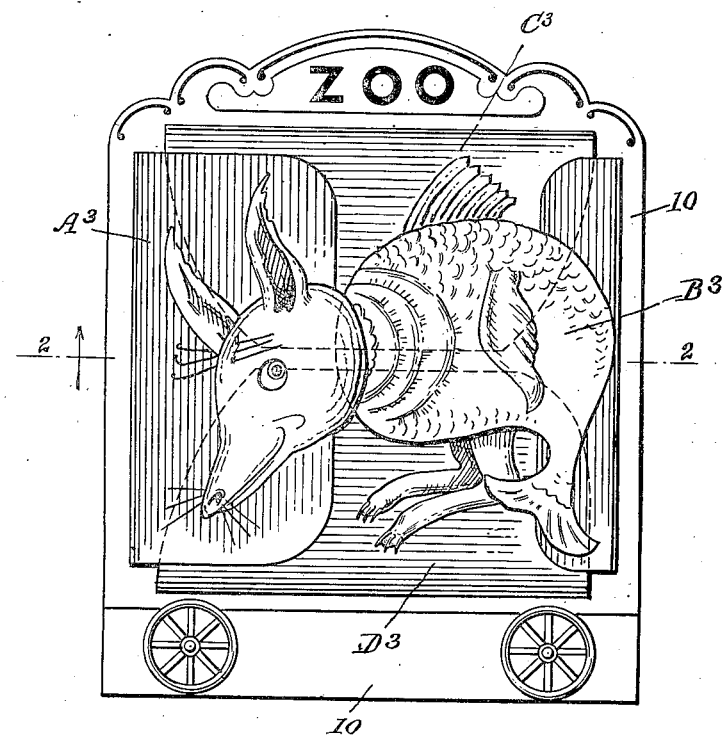
Figure 1 is a face view illustrating one form of device constructed according to and embodying our said invention.
Figure 2:
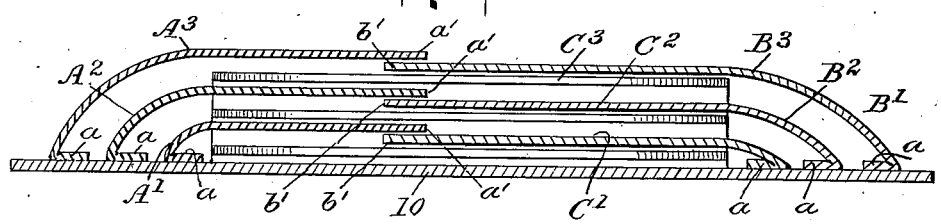
Fig. 2 is an enlarged or exaggerated sectional view, on the line 2—2 of Fig. 1, looking in the direction of the arrow.

In said drawings, the invention is shown as comprising four separate groups or series of elements arranged with their outer ends disposed to form a rectangular figure. For the purpose of illustration, the invention is shown with each group including a series of three elements, and the elements of each group representing a definite portion of a grotesque or fanciful animal, viz: a head portion, a body portion, a foot or leg portion, and a top or dorsal portion.

In said drawings 10 designates a flat substantially rectangular support representing generally a circus vehicle for the transportation of caged circus animals. The support 10 is formed of relatively thin material such as cardboard, and upon said support are mounted four groups of foldable elements A, B, C, D, each of which is, for the purposes of illustration, shown as comprising a series of three individual elements, $A^1$, $A^2$, $A^3$; $B^1$, $B^2$, $B^3$; $C^1$, $C^2$, $C^3$ and $D^1$, $D^2$, $D^3$. The elements of each group are all substantially rectangular in outline and provided at their outer ends with attaching flaps $a$ whereby said elements are severally secured by cementing, stapling or other means to said support with their ends in spaced parallelism to form a rectangular figure.

The elements of each group differ in detail from each other and from the elements of the remaining groups. The elements of the group A are substantially rectangular in form and are provided at their inner edges with registering rounded projections $a^1$ which form, in part, the neck parts of the heads of different animals.

The elements of group B are disposed opposite the group A and are provided at their inner edges with registering substantially elliptical projections $b^1$ representing or constituting the body parts of different animals.

The elements of the group C are arranged to occupy the space between the upper ends of the groups A and B, and embody the representations of back or dorsal parts $c$, and the elements D which occupy the space between the lower ends of the groups A and B embody the representations of leg or foot parts $d$ of different animals.

All of the elements of each group become progressively wider, as measured from their free edges to their secured edges, in order to insure the inner portions of the elements and the designs extending therefrom, which also become progressively larger in outline, will duly conceal from view the elements below the same.

The background formed by the square figure and also the background of each of the elements of each group are preferably of a dull black or other suitable color, so that any parts not covered by the respective designs will merge to form a common background of uniform color.

The illustrations or designs appearing on each element are preferably in bright colors or colors which contrast effectively with the color of the background.

The operation of the device will be largely obvious. It is to be noted that while the device, for the purposes of illustration merely, is shown composed of four groups each comprising a series of three elements, the number of elements of each group may be varied within limits.

With the device constructed as illustrated and described, it becomes possible to select any one of the three body elements $B^1$, $B^2$, $B^3$ and combine the same with any one of the head elements $A^1$, $A^2$, $A^3$, the back or dorsal elements $C^1$, $C^2$, $C^3$ and the leg or feet elements $D^1$, $D^2$, $D^3$, thus making possible a great number of different combinations for each of the body elements $B^1$, $B^2$, $B^3$.

It is to be noted further that while we have shown our invention in connection with the representations of a series of grotesque or fanciful zoological entities, that the same is not confined thereto, since the invention is equally applicable to the representation of actual or real animals, birds, fishes, and human beings or other objects or things, and that the number and arrangement of the groups may be varied to define polygonal figures of different forms.

Having thus described our said invention what we claim and desire to secure by Letters Patent is:

1. A device of the character described comprising a flat support and a plurality of groups of flat, foldable elements mounted upon said support, the elements of each group being disposed in superposed relation and having straight outer edges, attaching flaps extending from said outer edges secured to said support in parallelism and defining a figure of polygonal outline, said attaching flaps being arranged successively in series and each disposed inwardly of the next adjacent outer flap, said elements having their free ends possessing contours differing from each other and from the elements of the remaining groups and extending inwardly in overlapping relation and forming a plurality of complete structures severally differing from each other.

2. A device of the character described comprising a flat support and a plurality of groups of flat, foldable elements mounted on said support; the elements of each group being disposed in superposed relation and having straight outer edges, attaching flaps extending from the outer ends of said elements for hingedly securing said elements to said support in spaced parallelism and defining a figure of polygonal outline, one group of said elements possessing contours including head portions of different forms, a second group possessing body portions of different forms, a third group including foot or leg portions, and a fourth group including dorsal portions, the free ends of the elements of each group corresponding in outline generally with the remaining elements of each group and becoming progressively smaller in outline towards the lowermost element of each group to compensate for the positions of the hinge parts inwardly so that the free edges of the elements may be in substantial alignment when folded inwardly; the free ends of said elements extending inwardly in overlapping relation and being foldable to form a plurality of imaginary or fanciful animals or objects of different forms.

ELLIOTT E. STAPLES.
BRUNO GONELLA.